US012753361B1

(12) United States Patent
Siddiqui et al.

(10) Patent No.: US 12,753,361 B1
(45) Date of Patent: Oct. 6, 2026

(54) METHOD OF FRACTURING USING A XANTHAN/GUAR GUM CONTAINING FLUID

(71) Applicant: Sunita Hydrocolloids Inc., Houston, TX (US)

(72) Inventors: Farhan Siddiqui, Katy, TX (US); Mohit Hissaria, Sugar Land, TX (US); Danny Fred Wilson, Porter, TX (US); Pk Hissaria, Jodhpur Rajasthan (IN); Richard Wheeler, Crosby, TX (US); Zoraida Vazquez, Houston, TX (US)

(73) Assignee: SUNITA HYDROCOLLOIDS Inc., Houston, TX (US)

(*) Notice: Subject to any disclaimer, the term of this patent is extended or adjusted under 35 U.S.C. 154(b) by 0 days.

(21) Appl. No.: 19/076,798

(22) Filed: Mar. 11, 2025

(51) Int. Cl.

| | |
|---|---|
| ***C10M 107/36*** | (2006.01) |
| ***C09K 8/68*** | (2006.01) |
| ***C10N 20/00*** | (2006.01) |
| ***C10N 40/00*** | (2006.01) |
| ***E21B 43/26*** | (2006.01) |

(52) U.S. Cl.
CPC ............. *C10M 107/36* (2013.01); *C09K 8/68* (2013.01); *E21B 43/26* (2013.01); *C10N 2020/081* (2020.05); *C10N 2040/40* (2020.05)

(58) Field of Classification Search
CPC ........... C10M 107/36; C10N 2020/081; C10N 2040/40; E21B 43/26; C09K 8/68
See application file for complete search history.

(56) References Cited

U.S. PATENT DOCUMENTS

| | | | | |
|---|---|---|---|---|
| 4,155,314 | A * | 5/1979 | O'Callaghan .......... | A01C 7/004 47/9 |
| 4,304,300 | A | 12/1981 | Watson | |
| 4,466,890 | A | 8/1984 | Briscoe | |
| 4,479,630 | A | 10/1984 | Watanabe | |
| 4,524,829 | A | 6/1985 | Hanion | |
| 4,566,979 | A | 1/1986 | Githens | |
| 4,825,950 | A | 5/1989 | Kapakci et al. | |
| 4,979,564 | A | 12/1990 | Kalpakci et al. | |
| 5,226,480 | A | 7/1993 | Dovan et al. | |
| 5,881,813 | A | 3/1999 | Brannon et al. | |
| 6,060,434 | A | 5/2000 | Sweatman et al. | |
| 6,451,743 | B1 | 9/2002 | Fox | |
| 6,489,270 | B1 | 12/2002 | Vollmer et al. | |
| 6,734,146 | B2 | 5/2004 | Chatterji et al. | |
| 6,818,597 | B2 | 11/2004 | Harris | |
| 6,849,582 | B2 | 2/2005 | Grainger et al. | |
| 6,887,833 | B2 | 5/2005 | Brothers et al. | |

(Continued)

FOREIGN PATENT DOCUMENTS

| | | |
|---|---|---|
| EP | 2203538 B1 | 1/2012 |

OTHER PUBLICATIONS

Siddiqui et al., "A Novel Green Friction Reducer that Helps to Achieve the Goals of ESG Sandards", Society of Petroleum Engineers, Jun. 2023.

*Primary Examiner* — James C Goloboy

(57) ABSTRACT

Biodegradable friction reducers, fracturing fluid compositions containing friction reducers and methods for treating subterranean formations with friction reducers, wherein the friction reducers are a mixture of xanthan and guar gum having a weight ratio of about 3:97 to about 20:80. The friction reducer finds particular applicability in a slickwater fluid for the treatment of low permeability reservoirs.

5 Claims, 4 Drawing Sheets

(56) References Cited

U.S. PATENT DOCUMENTS

Figure 1:
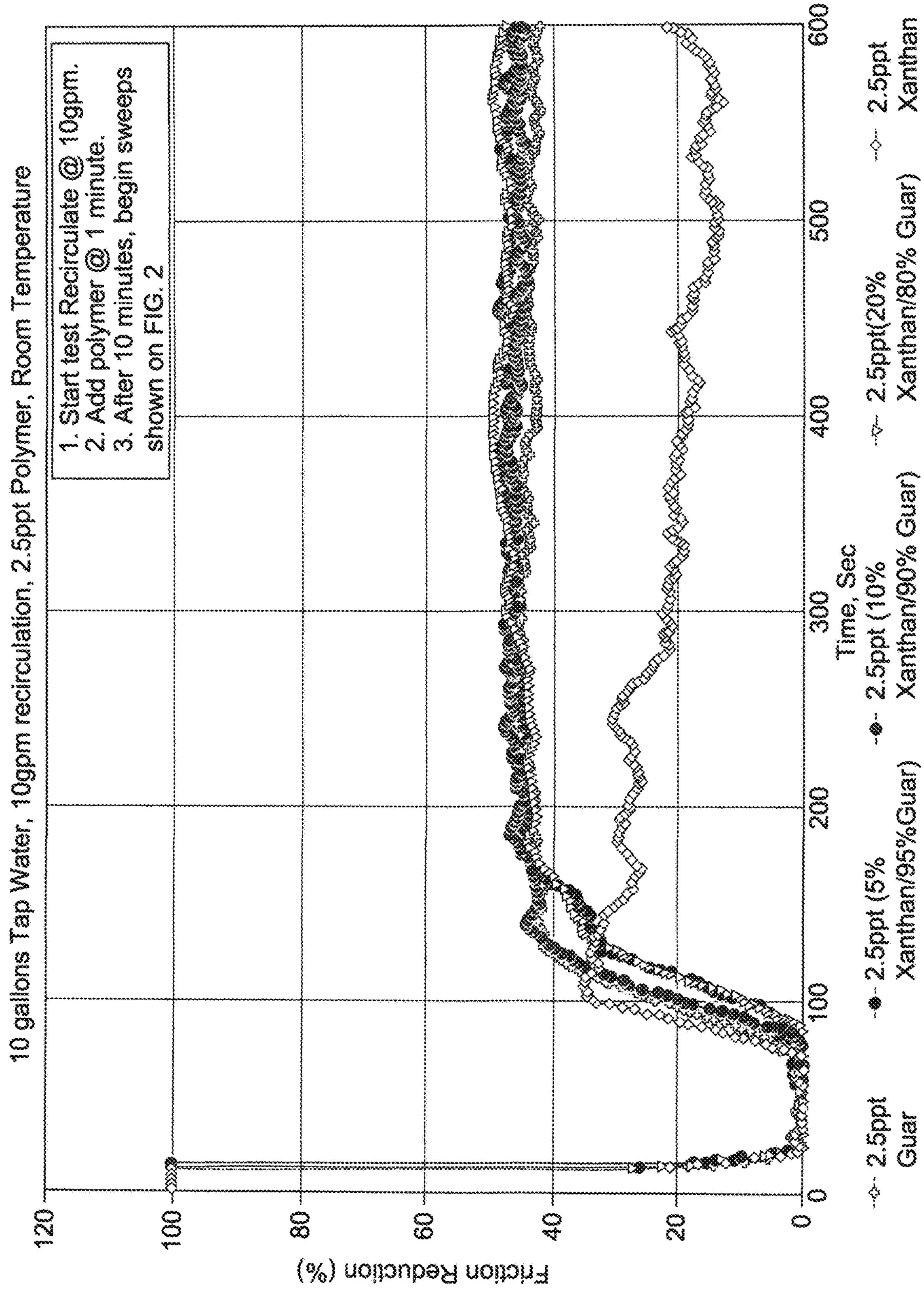

| | | | |
|---|---|---|---|
| 7,261,158 B2 | 8/2007 | Middaugh et al. | |
| 7,395,863 B2 | 7/2008 | Wang et al. | |
| 7,398,825 B2 | 7/2008 | Nguyen et al. | |
| 7,407,915 B2 | 8/2008 | Jones et al. | |
| 7,541,316 B2 | 6/2009 | Maresh | |
| 7,690,431 B2 | 4/2010 | Nguyen et al. | |
| 7,703,527 B2 | 4/2010 | Sullivan et al. | |
| 7,727,936 B2 | 6/2010 | Pauls et al. | |
| 7,727,937 B2 | 6/2010 | Pauls et al. | |
| 7,781,380 B2 | 8/2010 | Lin et al. | |
| 7,784,544 B2 | 8/2010 | Lindvig et al. | |
| 7,798,224 B2 | 9/2010 | Huang et al. | |
| 7,981,845 B2 | 7/2011 | Samuel et al. | |
| 8,076,270 B2 | 12/2011 | Smith et al. | |
| 8,097,567 B2 | 1/2012 | Wilson et al. | |
| 8,276,667 B2 | 10/2012 | Fu et al. | |
| 8,372,789 B2 | 2/2013 | Harris et al. | |
| 8,708,045 B2 | 4/2014 | Ogle et al. | |
| 8,728,989 B2 | 5/2014 | Kakadjian et al. | |
| 8,875,786 B2 | 11/2014 | Nguyen et al. | |
| 9,029,298 B2 | 5/2015 | Weaver et al. | |
| 9,574,127 B2 | 2/2017 | Chapman | |
| 9,587,169 B2 | 3/2017 | Plishka et al. | |
| 9,617,458 B2 | 4/2017 | Mirakyan et al. | |
| 9,683,167 B2 | 6/2017 | Nguyen et al. | |
| 9,688,905 B2 | 6/2017 | Nguyen et al. | |
| 9,790,777 B2 | 10/2017 | Nguyen et al. | |
| 10,035,948 B2 | 7/2018 | Sparks et al. | |
| 10,072,478 B2 | 9/2018 | Gupta et al. | |
| 10,138,415 B2 | 11/2018 | Bryant et al. | |
| 10,316,633 B2 | 6/2019 | Savari et al. | |
| 10,323,051 B2 | 6/2019 | Woodward et al. | |
| 10,428,260 B2 | 10/2019 | Hundt | |
| 10,428,264 B2 | 10/2019 | Chopade et al. | |
| 10,428,266 B2 | 10/2019 | Nguyen et al. | |
| 10,760,397 B2 | 9/2020 | Vo et al. | |
| 10,883,041 B2 | 1/2021 | Zha et al. | |
| 10,988,674 B2 | 4/2021 | Nguyen et al. | |
| 11,118,103 B2 | 9/2021 | Homma et al. | |
| 11,274,243 B2 | 3/2022 | Siddiqui et al. | |
| 11,441,406 B2 | 9/2022 | Nguyen et al. | |
| 11,472,993 B2 | 10/2022 | Giardini et al. | |
| 11,479,705 B1 | 10/2022 | Onaizi | |
| 11,542,817 B1 | 1/2023 | McGraw et al. | |
| 11,746,282 B2 | 9/2023 | Siddiqui et al. | |
| 11,898,095 B2 | 2/2024 | Refunjol et al. | |
| 11,970,654 B2 | 4/2024 | Naganawa et al. | |
| 11,981,865 B2 | 5/2024 | Abivin et al. | |
| 12,012,547 B2 | 6/2024 | Pinnawala et al. | |
| 12,012,549 B2 | 6/2024 | Dwarakanath et al. | |
| 12,054,669 B2 | 8/2024 | Siddiqui et al. | |
| 2003/0060375 A1 | 3/2003 | Grainger et al. | |
| 2004/0209780 A1 | 10/2004 | Harris et al. | |
| 2005/0028979 A1 | 2/2005 | Brannon et al. | |
| 2008/0026957 A1 | 1/2008 | Gurmen et al. | |
| 2008/0110624 A1 | 5/2008 | Nguyen et al. | |
| 2008/0182762 A1 | 7/2008 | Huang et al. | |
| 2012/0048557 A1* | 3/2012 | Hughes ................. | E21B 43/267 166/308.1 |
| 2012/0157356 A1* | 6/2012 | Dawson ................... | C09K 8/92 507/225 |
| 2012/0245060 A1 | 9/2012 | Jiang et al. | |
| 2012/0252707 A1 | 10/2012 | Li et al. | |
| 2013/0015115 A1 | 1/2013 | Landis et al. | |
| 2013/0025867 A1* | 1/2013 | Sun ........................... | F17D 1/17 166/308.1 |
| 2013/0137609 A1 | 5/2013 | Pierce et al. | |
| 2014/0174736 A1 | 6/2014 | Reddy et al. | |
| 2014/0262265 A1 | 9/2014 | Hutchins et al. | |
| 2016/0108713 A1 | 4/2016 | Dunaeva et al. | |
| 2016/0289526 A1 | 10/2016 | Alwattari et al. | |
| 2016/0347991 A1 | 12/2016 | Wheeler | |
| 2017/0088769 A1 | 3/2017 | Kesavan et al. | |
| 2017/0088770 A1 | 3/2017 | Kramer | |
| 2017/0369767 A1 | 12/2017 | Guo et al. | |
| 2019/0153304 A1 | 5/2019 | Zelenev | |
| 2022/0363972 A1 | 11/2022 | Jones et al. | |
| 2022/0363979 A1 | 11/2022 | Thomas et al. | |
| 2023/0167353 A1 | 6/2023 | Pinnawala et al. | |
| 2023/0183577 A1 | 6/2023 | Pinnawala et al. | |
| 2023/0183578 A1 | 6/2023 | Pinnawala et al. | |
| 2023/0203361 A1 | 6/2023 | Deville et al. | |
| 2023/0332037 A1 | 10/2023 | Pinnawala et al. | |
| 2024/0067867 A1 | 2/2024 | Siddiqui et al. | |
| 2024/0294824 A1 | 9/2024 | Solovyeva et al. | |
| 2024/0336831 A1 | 10/2024 | Jadhav et al. | |

* cited by examiner

METHOD OF FRACTURING USING A XANTHAN/GUAR GUM CONTAINING FLUID

FIELD

The disclosure relates to friction reducers of xanthan and guar, compositions containing the friction reducers, and methods for treating subterranean formations using the friction reducers.

BACKGROUND OF THE DISCLOSURE

Fracturing fluids are pumped under high pressure into a wellbore to stimulate oil and gas production from a subterranean hydrocarbon producing reservoir. The pumped fluid initiates and propagates one or more fractures in the reservoir. As the fluid moves through tubulars (tubing, work strings, casings, coiled tubings, drill pipes, other conduits, etc.), resistance encountered by the fluid increases friction. Generally, shear stress between the fluid and the tubular increases as the turbulent flow of the pumped fluid causes frictional resistance. A significant amount of energy is lost as the pressure within the tubular increases due to frictional resistance.

In some cases proppant may be included in the fluid to keep the fracture(s) open and maintain a conductive pathway so oil or gas may flow to the surface. Proppant laden fluids typically contains a viscosifying agent to aid in the transport of the proppant into the fracture. Such viscous fluids cause a larger pressure loss in the tubular (compared to less viscous fluids) which results in increased friction.

Increased friction pressure further arises during fracture initiation as the pumped fluid enters into the formation. Formation tortuosity causes frictional resistance to fluid flow contributing to increased surface treating pressure and is reduced by addition of a friction reducer. Friction reducers are also often used in a pumpable fluid to minimize friction pressure between production tubulars and the pumped fluid. Such materials reduce the frictional drag created during turbulent flow of the fracturing fluid through the tubulars, particularly when the flow is turbulent, thereby improving the efficiency of fluid transport into the formation.

A good friction reducer should cause a large decrease in friction when used in small concentrations, be inexpensive, have shear, temperature and pressure stability, work at all or most total dissolved solids (TDS) and not leave deposits which plug the formation.

Generally, high molecular weight shear sensitive linear polymers are used as friction reducers to alter the rheological properties of the fluid so that turbulent flow is minimized, thereby preventing consequent energy loss in the fluid as it is pumped through the pipe.

The most common friction reducers are polyacrylamides (PAM) which are often enhanced with sodium acrylamido-2-methylpropane sulfonate (sodium AMPS), sodium acrylate and acrylic acid as well as polymers thereof. Often, however, there is difficulty in handling such high molecular weight polymers because of their low rate of hydration and high viscosity when made into a slurry. Further, polymeric friction reducers often show reduced performance in the presence of conventional well treatment additives. For example, polymers containing the acrylate monomer, either added as a copolymer or hydrolyzed from polyacrylamide, have a reduced compatibility with high calcium brines.

Slickwater fracturing is a type of hydraulic fracturing which uses a low viscosity aqueous fluid to induce subterranean fracture(s). Slickwater fluids are basically fresh water or brine and do not contain a viscosfying agent and/or gelled or gellable surfactants. Such fluids, generally, have viscosities only slightly higher than unadulterated fresh water or brine.

Slickwater fracturing is commonly used in stimulation treatments of tight gas and shale gas reservoirs. Such fluids cause less damage to the formation due to the absence of viscosifying agents and/or surfactants. The low viscosity fluids are, however, pumped at higher rates than conventional fracturing fluids, typically above 100 bbl/min. Since slickwater fracturing relies on high pump rates, a large amount of frictional energy is lost due to the friction between the conduit and fluid. Frictional drag is created by the high turbulent flow of the fluid through the tubular.

At times, slickwater fluids may contain proppant. In light of the low viscosity of the fluid, its proppant-carrying capacity is lower than that of conventional crosslinked polymer gels used for non-slickwater fracturing. A lower concentration of proppant requires a higher volume of fracturing fluid to place a sufficient amount of the proppant into the induced fractures.

Slickwater fluids typically require friction reduction agents to reduce the frictional drag caused by the turbulent flow of the pumped fluid. While slickwater fluids may contain a sufficient amount of friction reducing agents to minimize tubular friction pressures, they typically do not increase the viscosity of the fracturing fluid by more than 1 to 2 centipoise (cP). Thus, in a typical slickwater operation, the fracturing fluid may contain one or more friction reducers which may be injected into the reservoir in order to minimize pipe wall friction and reduce the surface horsepower that would otherwise be required to achieve high pump rates of the fluid.

Friction reducers commonly used in conventional fracturing fluids, such as PAM, sodium AMPS and polymers containing acrylic acid and/or sodium acrylate are often unacceptable for use as friction reducers in slickwater fracturing since they react with iron and iron containing compounds as well as other cations. Such interactions typically form flocculants and/or crosslinked systems which ultimately obstruct and restrict flow through the tubulars. In some instances, operators have to stop the production process in order to clean the clogged passageway.

There is an ongoing need to develop slickwater fracturing fluids that have effective friction reduction to minimize energy loss but yet have sufficient viscosity for proppant-carrying capacity, when required, while being safe and environmentally friendly.

There is also a need for alternative friction reducers for use in conventional fracturing fluids which demonstrate better performance than those currently available.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment, an aqueous fluid is provided for pumping into a well. The fluid contains a fluid reducer comprises a mixture of xanthan and guar gum wherein the weight ratio of xanthan to guar gum is from about 3:97 to about 25:75 and wherein the fluid is void of a viscosifying agent or synthetic polymer.

In another embodiment, an aqueous fluid for pumping into a well is provided, the fluid comprising a friction reducer consisting essentially of a mixture of xanthan and guar gum. The weight ratio of xanthan to guar gum is from about 3:97 to about 25:75. The fluid is void of a polymer (other than the guar gum and xanthan).

In another embodiment, an aqueous fluid for pumping into a well is provided, the fluid comprising a mixture of xanthan and guar gum wherein the weight ratio of xanthan to guar gum is between from about 3:97 to about 25:75 wherein the viscosity of the aqueous fluid is less than or equal to 10 cP (when measured using a Grace 3600 viscometer having a R1 B1 cup and bob assembly rotating at 300 rpm or 511 $sec^{-1}$ at ambient temperature). The concentration of the friction reducer in the aqueous fluid is less than or equal to about 0.01 to about 0.5, typically from about 0.01 to about 0.2, weight percent based on the total weight of the aqueous fluid.

In another embodiment, the friction reducers disclosed in the paragraphs above are used in the stimulation of tight gas reservoirs. The presence of the friction reducer allows for more efficient pumping of a treatment fluid into the reservoir under high turbulent flow conditions.

In another embodiment, a method of fracturing a subterranean reservoir is provided by pumping into the reservoir any of the aqueous fluids described in the above paragraphs. The aqueous fluid is pumped at a pressure sufficient to create or enlarge a fracture in the subterranean formation.

In another embodiment, a method of slickwater fracturing a subterranean reservoir is provided wherein any of the aqueous fluids described in the above paragraphs is continuously pumped into the reservoir at a pressure sufficient to create or enlarge a fracture in the subterranean reservoir. The permeability of the subterranean reservoir is between from about 10 nanodarcies to less than or equal to 1.0 mD.

In still another embodiment, a method of reducing frictional drag created during turbulent flow of any of the aqueous treatment The friction reducers described in the paragraphs above exhibit synergy demonstrated by improved shear and temperature stability.

Further, when used in a fracturing treatment operation, the friction reducers described herein are easily degradable and do not leave any insoluble residues when degraded.

Accordingly, the disclosure includes features and advantages which are believed to enable friction reduction in the treatment of subterranean reservoirs. Characteristics and advantages of disclosure and additional features and benefits will be readily apparent to those skilled in the art upon consideration of the following detailed description and referring to the accompanying drawings.

DRAWINGS

The following figures are part of the present specification, included to demonstrate certain aspects of various embodiments of this disclosure and referenced in the detailed description herein:

FIG. 1 demonstrates percent friction reduction in fluids containing guar, xanthan and a mixture of guar and xanthan in ½" tube.

Figure 2:
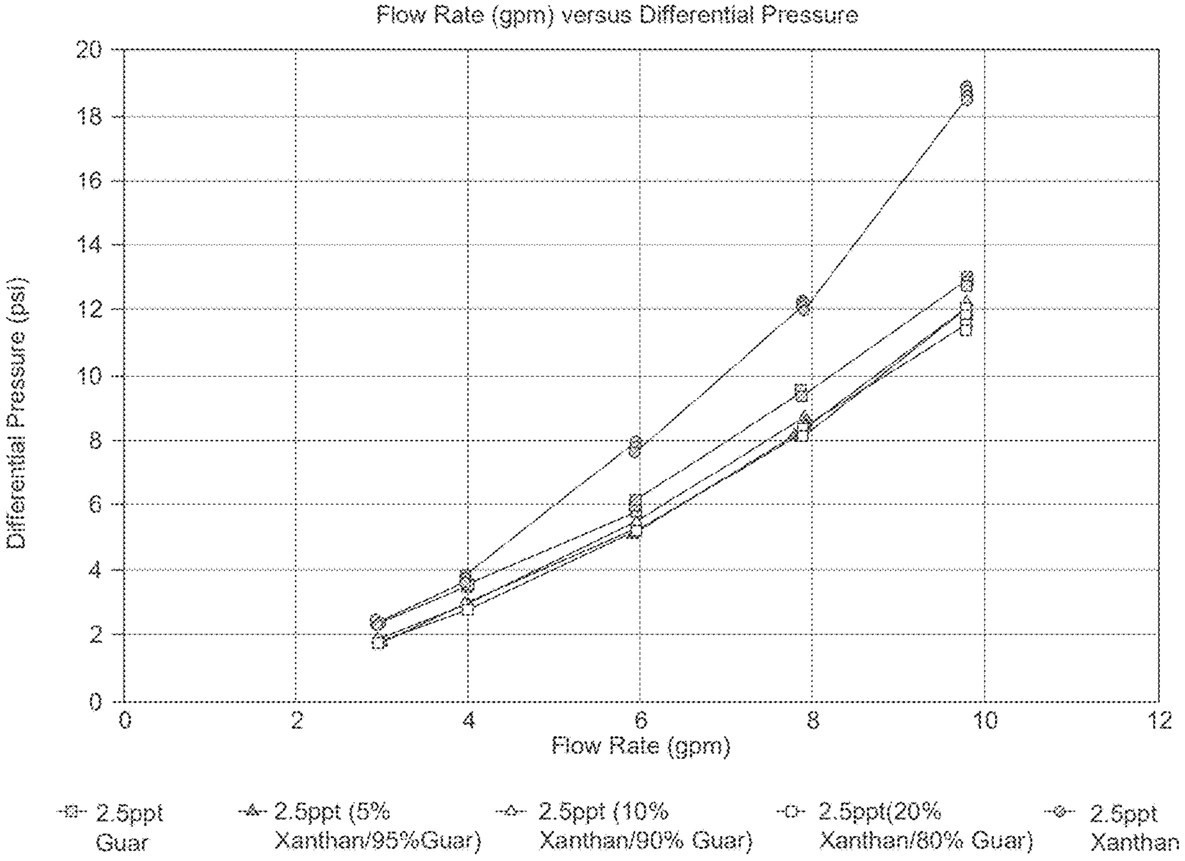

FIG. 2 demonstrates flow rate versus the pressure response of fluids containing guar, xanthan and a mixture of guar and xanthan in ½" tube.

Figure 3:
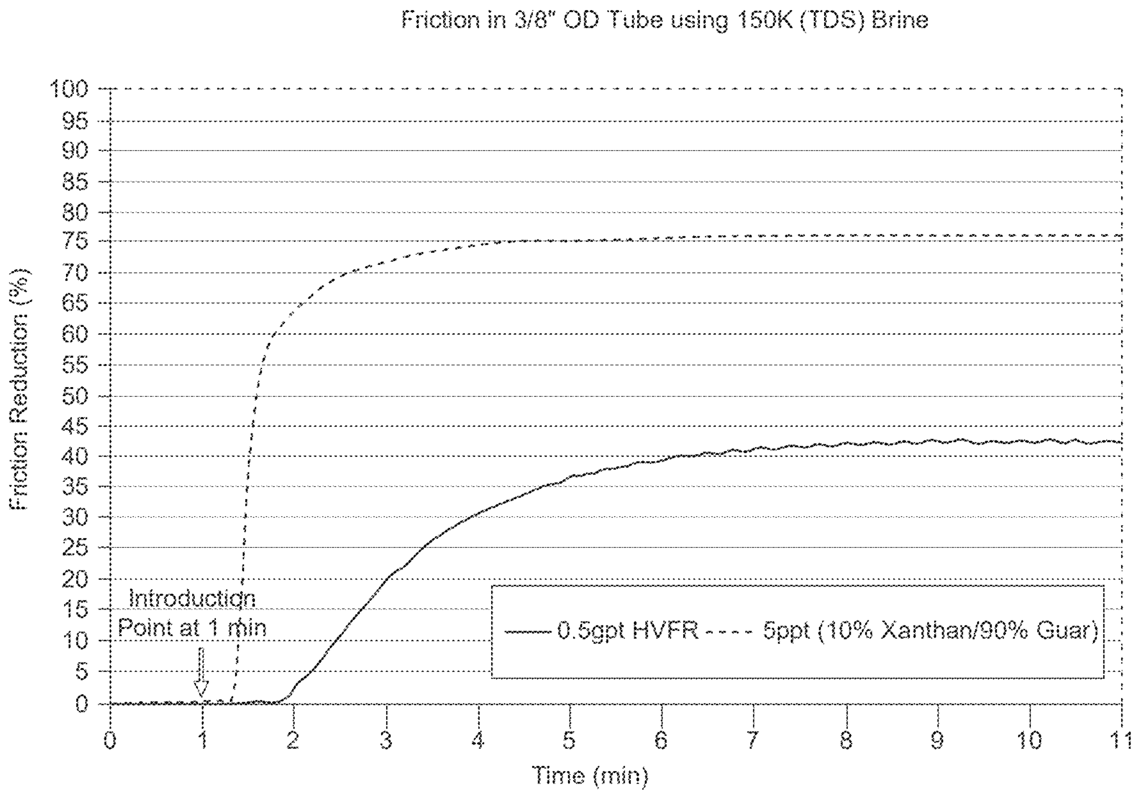

FIG. 3 illustrates friction reduction of a fluid containing guar and xanthan in synthetic brine in a flow loop having a ⅜" outer diameter.

Figure 4:
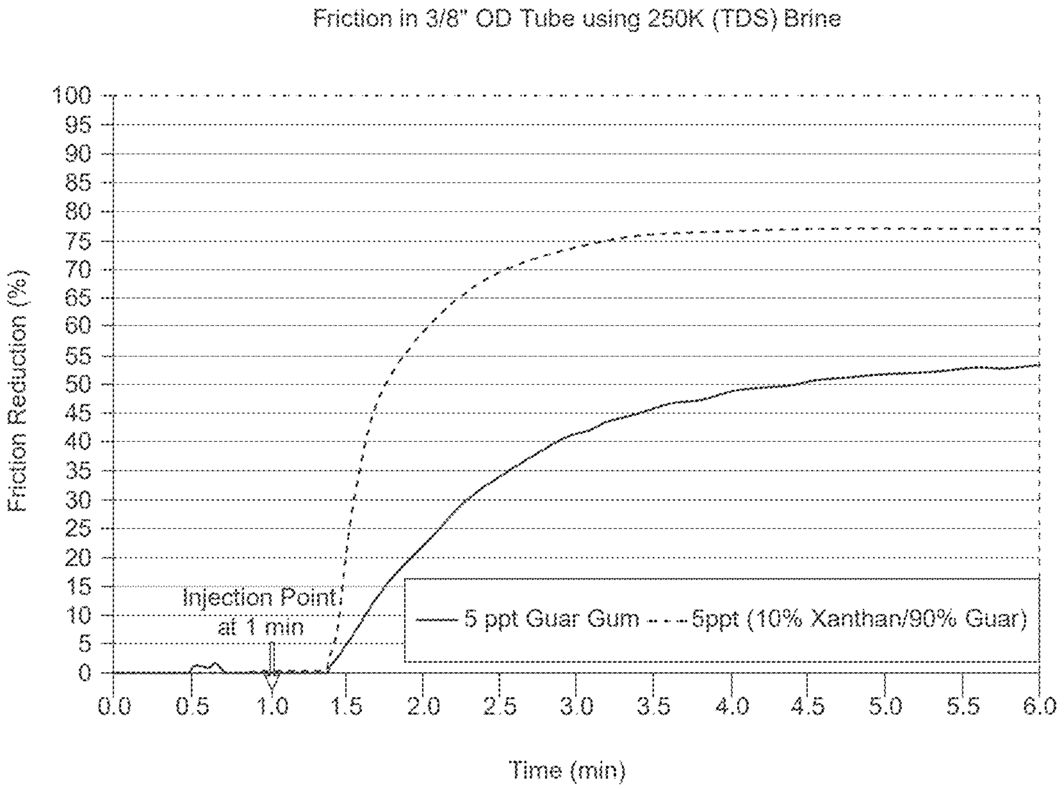

FIG. 4 compares friction reduction of a fluid containing guar and xanthan versus a fluid containing only guar in 250K synthetic brine in a flow loop having a ⅜" outer diameter.

DETAILED DESCRIPTION

The following description provides specific details, compositions, and processing conditions in order to provide a thorough description of embodiments of the disclosure. Characteristics and advantages of the present disclosure and additional features and benefits will be readily apparent to those skilled in the art upon consideration of the following detailed description of exemplary embodiments of the present disclosure and referring to the accompanying figures.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ."

Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The use of the terms "a" and "an" and "the" and similar referents in the context of describing the invention (especially in the context of the following claims) are to be construed to cover both the singular and the plural, unless otherwise indicated herein or clearly contradicted by context. The suffix "(s)" as used herein is intended to include both the singular and the plural of the term that it modifies, thereby including at least one of that term. "Optional" or "optionally" means that the subsequently described event or circumstance can or cannot occur, and that the description includes instances where the event occurs and instances where it does not.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

All viscosity measurements recited herein were measured using a Grace M3600 or Grace M5600 viscometer. Viscosity of aqueous fluids were measured on a Grace M3600 viscometer having a R1 B1 cup rotating at 300 rpm or 511 $sec^{-1}$ at designated intervals, such as at 3 minutes and 60 minutes at ambient temperatures. Viscosity of crosslinked gels, referenced in the Examples, were measured on a Grace M5600 viscometer having a R1 B5 (rotor/bob) configuration capable of temperatures up to 500° F. and pressures up to 1,000 psi. Viscosities being commonly measured at 100 (l/s)

between shear sweeps. For further details, see, API RP 13M, 1st Edition, July 2004, Recommended Practice for Measurement of Viscous Properties of Completion Fluids.

All references are incorporated herein by reference.

A mixture of xanthan gum and guar gum offers improved friction reduction in the treatment of a subterranean reservoir. The mixture is biodegradable. In an embodiment, the friction reducer is breakable into small particles with strong oxidizers and/or enzymes.

While the mixture is typically used as a dry powder when added to water, in some embodiments, the mixture may be slurried in mineral oil as well as other non-sheen forming oils and solvents prior to being added to water. In an embodiment, at least a portion of the water may be fresh water, brine, flowback water, fresh fracturing fluid, recycled fracturing fluid, flowback fracturing fluid or back-produced fracturing fluid, or combinations thereof. In an embodiment, the water is a brine comprising one or more dissolved inorganic salts in a total concentration from about 0.1 to about 20 weight percent based on the total weight of the fluid.

When pumped into a reservoir in a aqueous fluid, the friction reducer reduces frictional drag of the fluid created during turbulent flow of the fluid in the tubular(s) and within the reservoir. Productivity of the hydrocarbon producing reservoir is thus enhanced by the presence of the friction reducer in the treatment fluid. In an embodiment, the friction reducer defined herein is non-degradable at higher shear rates compared to conventional friction reducers. For instance, the friction reducers are relatively non-degradable when subjected to shear rates in excess of 2,000 $sec^{-1}$ at ambient temperatures over 10 minutes compared to friction reducers based on or containing polyacrylamide (which at best are only non-degradable up to shear rates of 1,500 to 1,800 $sec^{-1}$). In some instances, the friction reducers defined here are non-degradable when subjected to shear rates in excess of 10,000 $sec^{-1}$ at ambient temperatures over 10 minutes.

The guar of the mixture may be natural guar or any grade of guar gum in powder form. In an embodiment, the guar gum is non-derivatized guar though carboxyalkyl guars or hydroxyalkyl guars, such as carboxymethyl guar, carboxyethyl guar, carboxypropyl guar, hydroxypropyl guar, hydroxyethyl guar, hydroxybutyl guar and carboxymethylhydroxypropyl guar and mixtures thereof, may also be used. Preferably the guar has a molecular weight of about 1 to about 3 million and the particle size of the guar is typically between from about 60 mesh and about 400 mesh.

In an embodiment, the particle size of the xanthan gum may be less than 60 mesh (250 μm) and in some embodiments less than 80 mesh (180 μm).

The concentration of the xanthan gum in the aqueous fluid may be from about 0.001% to about 0.05%, typically from about 0.002 to about 0.012%, more typically from about 0.003 to about 0.005%, by weight of the fluid.

Typically, the weight ratio of the dry blend of xanthan gum:guar gum is between about 3:97 to about 25:75, more typically between from about 5:95 to about 15:85 including from about 5:95 to about 20:80. In a preferred embodiment, the weight ratio of xanthan to gum is about 10:90.

The treatment fluid is particularly desirable in the stimulation of low permeability gas reservoirs such as shale where the low viscosity aqueous fluid is pumped into the formation to induce subterranean fractures. The hydrated mixture suppresses the turbulence created during pumping of the aqueous fluid at high velocities. In such instances, the treatment fluid may be referred to as a slickwater fluid. Such fluids are basically fresh water, flowback water or brine having sufficient friction reducing agent to minimize tubular friction pressures. In a embodiment, fresh water comprises 95 volume % or more, preferably, 97% or more, and even more preferably 99% or more by weight of the aqueous base fluid. In an embodiment, the concentration of the friction reducer in the aqueous fluid is less than or equal to 0.01 to about 0.5 weight percent, in other cases from 0.01 to about 0.2 weight percent, based on the total weight of the aqueous fluid and, in some cases, in some instance from about 0.05 to about 0.1 weight percent.

Slickwater fluids generally have viscosities only slightly higher than unadulterated fresh water or brine. Typically, the friction reduction agents present in slickwater do not increase the viscosity of the fracturing fluid by any more than 1 to 4 cP, typically no more than 1 to 2 cP over unadulterated water.

In an embodiment, the viscosity of the aqueous fluid is less than or equal to 10 cP, typically less than 10 cP, more typically less than 3 cP, as well as less than or equal to 1 cP, at a shear rate of 300 $sec^{-1}$. The hydrated polymer suppresses the turbulence present in high velocity gradient water.

The xanthan/guar mixture is effective at very low concentration between from about 1 pound per thousand (ppt) to about 10 ppt. In one embodiment, the concentration of the friction reducer in the aqueous fluid is from about 0.01 to about 0.5 weight percent and more preferably from about 0.01 to about 0.2 percent by weight of the fracturing fluid ("by weight' refers to the total weight of the aqueous fluid slurry containing the friction reducer). In another embodiment, fresh water comprises about 95% or more, preferably, about 97% or more, and even more preferably about 99% or more by weight of the aqueous base fluid.

In an embodiment, the friction reducer may be present in a treatment fluid at a concentration less than about 0.01% by weight. At higher concentrations of greater than about 0.2% by weight of the aqueous base fluid, the xanthan/guar mixture may be effective as a thickening agent.

In some instances, the treatment fluid may further contain one or more biopolymers, such as cellulose, cellulosic derivatives (such as hydroxyalkyl celluloses), scleroglucan, starch, pectin, alginates, chitosan, polyhydroxyalkanoates, *cassia* gum, diutan, etc. When present, the amount of biopolymer is used is typically less than about 10 to 15 weight percent of the total weight of the combination of the xanthan and guar gum.

Further, the friction reducers effectively reduce frictional drag during turbulent flow of the fluid while exhibiting a viscosity required by the fracturing fluid. The exclusion of viscosifying agents and/or polymers in the fluid makes the aqueous fluid more economical than conventional friction reducers. The synergism offered by the combination of the xanthan and guar gum at low concentrations is unpredictable.

In one embodiment, the temperature of the aqueous fluid containing the friction reducer mixture pumped into the reservoir may be less than about 150° C., preferably 120° C. or less and even more preferably 100° C. or less.

While the fluid may contain a viscoelastic surfactant or linear viscosifying polymer, typically the fluid is void of any viscosifying agent or crosslinking agent (other than the xanthan gum and guar gum). (When present, the amount of viscoelastic surfactant or linear viscosifying polymer in the aqueous fluid does not exceed 6% by weight of the aqueous fluid.) The absence of any synthetic polymer (including polyacrylamide including hydrolyzed or partially hydrolyzed polyacrylamide) in the friction reducer promotes the sustainable chemistry of the blend and provides a friction reducer tolerant of iron, iron containing materials as well as cationic materials, such as calcium, strontium, etc.

The synergistic components of the mixture further effectively reduce friction in all Total Dissolved Solids (TDS) brines. Since the friction reducers is very tolerant of brines with high TDS, use of the friction reducers allows one to avoid the need for separate friction reducers for fresh water, mid brine, high brine, cationic liquid friction reducer, as well as high viscosity liquid friction reducer.

The aqueous fracturing fluid may also contain one or more conventional additives common to the well service industry such as corrosion inhibitors, demulsifying agents, scale inhibitors, paraffin inhibitors, gas hydrate inhibitors, asphaltene inhibitors, dispersants, demulsifying agents, oxygen scavengers, biocides, tracers, surfactants and hydrogen sulfide scavengers, etc.

At times, the aqueous treatment fluid may be combined with proppant, such as a conventional proppant like quartz, sand grains, glass beads, aluminum pellets, ceramics, resin coated ceramics, plastic beads, nylon beads or pellets, resin coated sands, sintered bauxite and resin-coated sintered bauxite. The presence of the xanthan gum combined with the guar provides the friction reducer with improved proppant suspension properties since xanthan exhibits increased viscosity at low shear rates. However, the friction reducer is neither designed for proppant suspension of high concentrations of proppant such as those used in a typical frac pack or gravel pack. Neither is the friction reducer designed to achieve improved proppant suspension at higher temperatures which may be evident in the design of some completion fluids (such as frac pack and gravel pack).

In other instances, the well treatment fluid may include a breaker to break down the viscous nature of the fluid. When present, the concentration of breaker in the fluid is normally between about 0.1 lb/1000 gals, and about 10 lb/100 gals. Examples of suitable types of oxidizing breakers include, but are not limited to, ammonium persulfate, sodium persulfate, ammonium peroxydisulfate, encapsulated ammonium persulfate, potassium persulfate, encapsulated potassium persulfate, inorganic peroxides, sodium bromate, sodium perchlorate, encapsulated inorganic peroxides, organic peroxides, encapsulated organic peroxides, sodium perborate, magnesium perborate, calcium perborate, encapsulated sodium perborate. Further, enzyme breakers may be used specifically for the bonds of xanthan as well as polysaccharides.

Aqueous fluids containing the friction reducer are especially effective in the treatment of low permeability reservoirs, such as those having permeabilities between from about 10 nanodarcies to less than or equal to about 1.0 mD, including shale and limestone.

To effectively access such tight formations, the reservoir is often drilled horizontally and may optionally be subjected to one or more fracture treatments to stimulate production. During hydraulic fracturing of the low permeability formations, the slickwater fluid is pumped at high pressures and at high rates into the wellbore penetrating the subterranean formation. Slickwater fracturing operations typically proceed by the continuous injection of slickwater into the wellbore. In some cases, slickwater fluids may be continuously pumped down the wellbore as fast as 50 bbl/min and as fast as 150 bbl/min. to fracture the low permeability formation. Without using slickwater, the top speed of pumping is typically less than 50 bbl/min and often from 15 to 20 bbl/min.

Further, use of the well treatment agent in slickwater fracturing improves leak-off control of filtrate into the formation.

In one embodiment, the aqueous fluid is a brine comprising one or more dissolved inorganic salts in a total concentration between 0.1 and 20 weight percent of the total weight of the aqueous base fluid. The inorganic salt may comprise one or more monovalent or divalent or trivalent cations and monovalent and divalent anions. The trivalent cations comprise iron cations, boron cations or a combination of iron and boron cations. In another embodiment, the divalent cations may comprise calcium and iron cations as well as magnesium and strontium cations. In another preferred embodiment, the divalent cations comprise both calcium, iron, strontium and magnesium cations. In an embodiment, the monovalent cations comprise sodium cations and/or potassium cations. In another embodiment, the divalent anions comprise of sulfates, sulfides and oxides. In another preferred embodiment, the monovalent anions comprise of chlorides, carbonates and bicarbonates.

In an embodiment, the friction reducer is a multi-functional friction reduction since it may, in addition to offering resistance to turbulent flow, serve in other capacities. For instance, the friction reducer may be capable of tolerating iron. Being iron tolerant, the friction reducer has been shown to not react when admixed with ferric chloride or other iron containing or iron producing components in the reservoir. This is unlike polymeric friction reducers, such as polyacrylamides, which react with ferric chloride in downhole conditions, thereby creating agglomerations of particles which plug the formation, the perforations, and gum up the tubulars and surface equipment. There is a significant cost to remediate these damages to the well and equipment.

In another embodiment, the residual total organic nitrogen in the friction reducer may be below 7%.

In another embodiment, regain permeability of the friction reducer is above about 80%.

Further, the friction reducer does not block the screen with iron present.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

The following examples are illustrative of some of the embodiments described herein.

The guar gum referenced was a 40/45 guar manufactured by Sunita Hydrocolloids Inc. as SunTech52 PBS. A 40 pptg (lbs/1000 gallons) sample will of the guar yields between 40-45 cP on a Fann 35 type viscometer at 511 (1/s) shear rate when configured with a R1 rotor and B1 bob.

The xanthan gum was commercially available as Kelzan from CPKelco Company.

The performance of friction reducers in field applications were approximated by using a Flow Loop apparatus, commercially available from OFI Testing Equipment (OFITE), and having the following flop loop components: a progressive cavity pump capable of greater than 10 gallons per minute; a 15-gallon tank with tapered bottom; an overhead mixer in the tank to insure dispersion and mixing of product; transfer tubes allowing the fluid to flow from the tank, through the pump, to the measurement section, and back into the tank; a ½ in. (Internal ID=0.403 in.) straight smooth tube used in the measurement section where differential pressure is measured via a pressure transducer and ⅛ in. tubes; a. thermocouple to measure temperature; a Coriolis flow meter for measuring mass flow rate, density, and volumetric flow rate; and computer, software, and instrumentation to control, monitor, and gather test data. The Flow Loop approximates the performance of friction reducers for application in field conditions.

Exemplary data recorded in the Flow Loop apparatus and may be summarized in Table I below:

TABLE I

| Elapsed Time (s) | Density (ppg) | Volume Flowrate (gal//min) | Mass Flowrate (g/s) | Tank Volume (V) | Temperature 1 (C) | Delta Pressure 1 (V) | Delta Pressure 2 (V) |
|---|---|---|---|---|---|---|---|
| 2 | 1.40 | 0.99 | 18.66 | 2.87 | 19.88 | 0.97 | 0.93 |
| 3 | 1.40 | 1.01 | 15.15 | 2.87 | 19.88 | 1.00 | 1.54 |
| 5 | 1.40 | 1.73 | 23.21 | 2.87 | 19.83 | 2.16 | 1.39 |
| 6 | 1.40 | 2.25 | 64.25 | 2.94 | 19.89 | 2.55 | 2.28 |
| 8 | 1.40 | 2.62 | 93.24 | 2.95 | 19.95 | 2.82 | 1.53 |
| 10 | 1.39 | 2.56 | 152.20 | 2.94 | 20.00 | 2.43 | 1.12 |

The calibration of the Flow Loop was evaluated by flowing water at various rates and measuring the differential pressure responses. The rate vs pressure response data was processed using fluid dynamic equations and plotted on a Moody diagram of Reynolds Number versus Fanning Friction Factor and compared to known correlation equations for water using well-known Chen and Nikuradse equations.

Following calibration, water was flowed at a substantial rate to remove all air from the pressure measurement lines by opening the bleeder valve while the fluid flowed through the system. The tank was then filled with water to approximately 5-10 gallons. The flow valves were configured so that fluid was returned to the tank. The mixer was set to the appropriate speed to establish a slight vortex where the product was readily mixed and no air was incorporated. Testing was then initiated through software as the fluid flowed and data was recorded.

Example 1

Following calibration the following polymers were added to the tank at 1 minute: 2.5 pounds per thousand (ppt) guar; 2.5 ppt mixture (5% xanthan and 95% guar); 2.5 ppt mixture (10% xanthan and 90% guar); 2.5 ppt mixture (20% xanthan and 80% guar) and 2.5 ppt xanthan. The addition of polymer into the vortex allowed quick and thorough mixing. Using tap water as a reference, the percent friction reduction was calculated and plotted as shown in FIG. 1.

The fluids were then subjected to recirculation 10 gallons per minute (gpm) for about 10 minutes for measuring the hydration rate of the product. The flow rate was then reduced from 10 gpm to 8 gpm. The pressure response was allowed to stabilize and data was recorded under the stabilized conditions for 30-90 seconds before decreasing the flow rate further. Data was recorded at 10, 8, 6, 4 and 3 gpm. The data was plotted on a flow rate (gpm) versus pressure (psi) response format and is featured in FIG. 2.

The results show xanthan gum having the highest pressure response at each flow and thus the highest friction pressure. Guar gum had the second-highest pressure response at each flow rate and therefore had the second-highest friction pressure. Combinations of xanthan gum and guar gum at 5, 10, and 20% Xanthan demonstrated lower pressure responses at each respective flow rate. This is indicative of lower overall friction pressure. The combination of xanthan gum and guar gum demonstrates a synergistic interaction with respect to friction pressure. Since friction pressure is largely a mechanical measurement of resistance to flow, it would be expected that combinations of these two chemicals would result in friction pressure measurements somewhere between the curves of the guar gum and xanthan gum.

Example 2

Two different brines were prepared having 250K and 150K Total Dissolved Solids (TDS). The chemical composition of the brines is set forth in Table II:

TABLE II

| 250 K Brine | | 150K Brine | |
|---|---|---|---|
| Salt | Wt. (g/L) | Salt | Wt. (g/L) |
| NaCl | 189.123 | NaCl | 96.471 |
| KCl | 2.511 | KCl | 1.540 |
| $MgCl_2$ | 5.702 | $MgCl_2$ | 11.430 |
| $CaCl_2$ | 25.392 | $CaCl_2$ | 59.380 |
| $BaCl_2$ | 0.003 | $BaCl_2$ | 7.470 |
| $SrCl_2$ | 1.420 | $SrCl_2$ | 17.520 |
| $Na_2SO_4$ (Anhy) | 0.762 | $Na_2SO_4$ (Anhy) | * |
| $NaHCO_3$ (Anhy) | 0.945 | $NaHCO_3$ (Anhy) | 0.068 |
| $H_3BO_3$ | 0.172 | $H_3BO_3$ | * |
| $FeCl_2$ | * | $FeCl_2$ | * |
| LiCl | 0.110 | | |
| $KH_2PO_4$ | 0.053 | | |

Different concentrations of the samples were prepared. Each sample was then added to deionized water, tap water or brine solution.

The Flow Loop apparatus described in Example 1 was used for friction pressure measurements of friction reducers and to analyze the data in straight smooth tubes. The fluids were prepared for a 10% xanthan/90% guar formulation at 5 ppt for the 250K and 150K TDS brine. The results were compared to polyacrylamide based friction reducer and guar gum. Samples were tested with the different brines by measuring their friction reduction percentage through ⅜" outer diameter (OD) pipes. The water sample was circulated throughout the flow loop at a rate of 6 gallons per minute (gpm). Once the rate was established for a total duration of three minutes, the loop was discharged and refilled with the already hydrated solution of the products at specific loadings. The solutions were then circulated to establish the reduced friction pressures which were used to calculate the friction pressure percentages.

A Flow Loop apparatus similar to that used in Example 1 was used running 5 ppt of 10% xanthan/90% guar formulation in 150K brine. First, the brine water was pumped through the flow loop having ⅜" diameter tubing. As the loading of friction reducer in the water was increased to 5 ppt, a significant friction reduction in the range of 80% occurred. FIG. 3 also illustrates that the friction reduction solution provided both superior hydration and greater overall friction reduction, which translates directly to better field performance.

FIG. 4 illustrates the comparison of a 5 ppt 10% xanthan/90% guar with 5 ppt guar gum in 250K TDS brine in the flop loop under turbulent flow. Most commercial friction reducers are designed for low-density fluids or water in fracture systems, their dispersion and solubility characteristics in high-density brine (250K) usually being unacceptable for field applications in fracturing. Additionally, high salt content and low free water in brines diminishes effectiveness of a friction reducer. However, the 10% xanthan/90% guar mixture demonstrates almost 80% friction reduction which is higher than gum at approximately 55% friction reduction.

Example 3

Selecting a suitable fracturing fluid procedure is critical to the success of treatments of a subterranean reservoir and plays an essential role in reducing formation damage. Regain conductivity screening was used for optimizing the friction reduction performance by quantifying friction reduction damage and evaluating fluid compatibility to minimize operational costs and risks. A long-term fracture conductivity testing was performed on the samples at a closure stress of 2,000 psi. The tests were performed at a temperature of 180° F. using a 2% KCl solution with the cells loaded at 2 lb/ft$^2$ between Ohio sandstone cores. Table III shows the regained conductivity for three samples, linear and crosslinked guar gum, and a mixture of 10% xanthan/90% guar at 180° F. with an ammonium persulfate (APS) breaker for 100 mesh white sand. For making the solution, 10 ppt of polymer were mixed with 1 ppt of the breaker. Permeability was measured before and after fluid injection. Then, different permeability was determined as a regain permeability.

TABLE III

| Sample Name | Sample (ppt) | Breaker, APS (ppt) | % Regain Permeability |
|---|---|---|---|
| Guar Gum (Linear gel) | 10 | 1 | 55 |
| Guar gum (Crosslinked gel) | 20 | 1 | 50 |
| 10%Xanthan/ 90% Guar | 10 | 1 | 82 |

Based on these results, the 10% xanthan/90% guar mixture exhibited a much higher regained permeability in the fracture formation compared to both linear and crosslinked guar gum.

Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Embodiment 1. An aqueous fluid for pumping into a well, the fluid comprising a mixture of xanthan and guar gum and, optionally, a biopolymer, wherein the weight ratio of xanthan to guar gum is from about 3:97 to about 25:75.

Embodiment 2. The aqueous fluid of embodiment 1, wherein the fluid is void of a synthetic polymer.

Embodiment 3. The aqueous fluid of embodiment 1 or 2, wherein the viscosity of the aqueous fluid is less than or equal to 10 cP when measured using a Grace M3600 viscometer having a R1 B1 cup and bob assembly rotating at 300 rpm or 511 sec$^{-1}$ at ambient temperature.

Embodiment 4. The aqueous fluid of any of embodiments 1 to 3, wherein the concentration of the friction reducer in the aqueous fluid is less than or equal to 0.01 to about 0.5 weight percent based on the total weight of the fluid.

Embodiment 5. An aqueous fluid for pumping into a well, the fluid comprising a mixture of xanthan and guar gum and, optionally, a biopolymer, wherein the weight ratio of xanthan to guar gum is from about 3:97 to about 25:75, the viscosity of the aqueous fluid is less than or equal to 15 cP when measured using a Grace 3600 viscometer having a R1 B1 cup and bob assembly rotating at 300 rpm or 511 sec$^{-1}$ at ambient temperature, and the concentration of the friction reducer in the aqueous fluid is less than or equal to about 0.01 to about 0.5 weight percent based on the total weight of the aqueous fluid.

Embodiment 6. The aqueous fluid of embodiment 5, wherein the concentration of the friction reducer in the aqueous fluid is about 0.03 to about 0.12 weight percent.

Embodiment 7. The aqueous fluid of any of embodiments 1 to 6, wherein the weight ratio of xanthan to guar gum is from about 5:95 to about 20:80.

Embodiment 8. The aqueous fluid of any of embodiments 1 to 7, wherein the viscosity of the aqueous fluid is from 1 to 10 cP when measured using a Grace 3600 viscometer having a R1 B1 cup and bob assembly rotating at 300 rpm or 511 sec$^{-1}$ at ambient temperature.

Embodiment 9. The aqueous fluid of embodiment 8, wherein the viscosity of the aqueous fluid is less than or equal to 3 cP when measured using a Grace 3600 viscometer having a R1 B1 cup and bob assembly rotating at 300 rpm or 511 sec$^{-1}$ at ambient temperature.

Embodiment 10. The aqueous fluid of any of embodiments 1 to 9, wherein the concentration of the xanthan gum in the fluid is from about 0.001% to about 0.05% by total weight of the aqueous fluid.

Embodiment 11. The aqueous fluid of embodiment 10, wherein the concentration of the xanthan gum in the fluid is from about 0.003% to about 0.012% by total weight of the aqueous fluid.

Embodiment 12. The aqueous fluid of any of embodiments 1 to 11, wherein the aqueous fluid comprises a brine comprising one or more dissolved inorganic salts in a total concentration from about 0.1 to about 20 weight percent based on the total weight of the aqueous fluid.

Embodiment 13. The aqueous fluid of any of embodiments 1 to 12, wherein the guar is selected from the group consisting of natural gum, gum guar, a carboxyalkyl guar, a hydroxyalkyl guar, carboxymethylhydroxypropyl guar and mixtures thereof.

Embodiment 14. The aqueous fluid of any of embodiments 1 to 13 which is void of a polyacrylamide.

Embodiment 15. The aqueous fluid of any of embodiments 1 to 14, wherein the amount of water in the aqueous fluid is greater than or equal to 95 volume percent.

Embodiment 16. The aqueous fluid of any of embodiments 1 to 15, wherein the mixture of xanthan and guar in the aqueous fluid is resistant to degradation when exposed to a shear rate in excess of 2,000 $sec^{-1}$ at ambient temperatures over 10 minutes.

Embodiment 17. The aqueous fluid of embodiment 16, wherein the mixture of xanthan and guar in the aqueous fluid is resistant to degradation when exposed to a shear rate up to 10,000 $sec^{-1}$ at ambient temperature over 10 minutes.

Embodiment 18. A method of fracturing comprising introducing into a wellbore penetrating a subterranean formation the aqueous fluid of any of embodiments 1 to 17 at a pressure sufficient to create or enlarge a fracture in the subterranean formation.

Embodiment 19. A method of slickwater fracturing a subterranean reservoir comprising continuously pumping into the reservoir the aqueous fluid of any of embodiments 1 to 17 at a pressure sufficient to create or enlarge a fracture in the subterranean reservoir wherein the permeability of the subterranean reservoir is from about 10 nanodarcies to less than or equal to 1.0 mD.

Embodiment 20. A method of reducing frictional drag of a treatment fluid created during turbulent flow of the fluid within an underground reservoir comprising continuously pumping into the reservoir any of the treatment fluids of embodiments 1 to 17.

Embodiment 21. The method of any of embodiments 18 to 20, wherein the reservoir is a shale reservoir.

Embodiment 22. The method of embodiments 18 to 21, wherein the presence of the friction reducer in the aqueous fluid does not increase the viscosity of the fracturing fluid by any more than 1 to 2 cP of that of unadulterated water.

Embodiment 23. The method of any of embodiments 18 to 22, wherein the aqueous fluid is continuously pumped into the reservoir at a speed from about 50 bbl/min to about 150 bbl/min.

Embodiment 24. The method of any of embodiments 18 to 23, wherein the water of the aqueous fluid is freshwater, recycled water, flowback fracturing fluid, back-produced fracturing fluid or a combination thereof.

Embodiment 25. The method of any of embodiments 18 to 24, wherein the friction reducer in the aqueous fluid does not react with iron in the reservoir.

Embodiment 26. The method of any of embodiments 18 to 25, wherein the regain permeability of the friction reducer in the treatment fluid is greater than 80%.

What is claimed is:

1. A method of slickwater fracturing a subterranean reservoir comprising continuously pumping into the reservoir an aqueous fluid at a pressure sufficient to create or enlarge a fracture in the subterranean reservoir wherein the permeability of the subterranean reservoir is from about 10 nanodarcies to less than or equal to 1.0 mD and further wherein the aqueous fluid is void of a synthetic polymer and comprises a mixture of xanthan and guar gum and, optionally, a biopolymer, and the weight ratio of xanthan to guar gum in the aqueous fluid is from about 3:97 to about 25:75.

2. The method of claim 1, wherein the reservoir is a shale reservoir.

3. The method of claim 1, wherein at least one of the following is true:

(a) the concentration of the xanthan in the aqueous fluid is from about 0.001% to about 0.05% by total weight of the aqueous fluid;

(b) the guar is selected from the group consisting of natural gum, gum guar, a carboxyalkyl guar, a hydroxyalkyl guar, carboxymethylhydroxypropyl guar and mixtures thereof; or (c) the aqueous fluid comprises a brine comprising one or more dissolved inorganic salts in a total concentration from about 0.1 to about 20 weight percent based on the total weight of the aqueous fluid.

4. The method of claim 1, wherein the viscosity of the aqueous fluid is less than or equal to 15 cP when measured using a Grace M3600 viscometer having a R1 B1 cup and bob assembly rotating at 300 rpm or 511 $sec^{-1}$ at ambient temperature.

5. The method of claim 1, wherein the amount of water in the aqueous fluid is greater than or equal to 95 volume percent.

* * * * *